United States Patent

[11] 3,608,868

| [72] | Inventor | Heinz Koch |
| | | Ludwigsburg, Germany |
| [21] | Appl. No. | 777,367 |
| [22] | Filed | Nov. 20, 1968 |
| [45] | Patented | Sept. 28, 1971 |
| [73] | Assignee | Werner & Pfleiderer |
| | | Stuttgart-Feuerbach, Germany |
| [32] | Priority | Dec. 16, 1967 |
| [33] | | Germany |
| [31] | | P 16 79 884.8 |

[54] CONTINUALLY MIXING AND KNEADING DEVICE WITH TWO OR MORE SCREWS FOR A PLASTICIZABLE MATERIAL
7 Claims, 4 Drawing Figs.

[52] U.S. Cl..................................... 259/6,
259/104
[51] Int. Cl..................................... B01f 7/02,
B29b 1/10
[50] Field of Search............................ 259/6, 104,
103, 21, 41, 40

[56] References Cited
UNITED STATES PATENTS
| 2,231,357 | 2/1941 | Burghauser et al. .......... | 259/6 |
| 2,570,864 | 10/1951 | Rowlson ..................... | 259/104 |
| 3,078,511 | 2/1963 | Street........................ | 256/6 UX |
| 3,122,356 | 2/1964 | Erdmenger.................... | 259/104 |
| 3,392,962 | 7/1968 | Fritsch et al. ............... | 259/9 |
| 3,423,074 | 1/1969 | Loomans...................... | 259/6 |
| 3,446,485 | 5/1969 | Fischer....................... | 259/6 |
| 3,463,459 | 8/1969 | Loomans et al. .............. | 259/6 X |

*Primary Examiner*—James Kee Chi
*Attorney*—Hane & Baxley

ABSTRACT: A continuously operating device for homogeneously mixing components of a plasticizable material has an input zone including unidirectionally rotating meshing screw elements for mixing components of the material received therein and feeding the mixed components to a dispersion zone also including rotatable meshing screw elements. The dispersion zone, in turn, conveys the components received therein from the input zone, after dispersing the same, to a mixing zone the screw elements of which have fewer threads than the screw elements in the dispersion zone and are preferably not in mesh whereby the components are homogeneously mixed when leaving the mixing zone. Instead of using one dispersion zone and one mixing zone two or more such couples may be provided in one device. Due to the arrangement of the screw elements in the mixing zone the desired homogeneous mixture is obtained at the downstream end of the mixing zone.

PATENTED SEP28 1971 3,608,868

INVENTOR.
HEINZ KOCH
BY Hane and Baxley
ATTORNEYS

CONTINUALLY MIXING AND KNEADING DEVICE WITH TWO OR MORE SCREWS FOR A PLASTICIZABLE MATERIAL

BACKGROUND

The invention relates to a continuously operating mixing and kneading device for components of plasticizable material and more particularly to a mixing and kneading device with two or more unidirectionally rotating screws in tight mesh with each other at least in the input zone and the dispersion zone of the device.

Mixing and kneading devices of the general kind above referred to have excellent dispersion capabilities and also effect a satisfactory mixing within a narrow spectrum of dwell time within the device. A disadvantage of such devices is that they have a very poor mixing capability in lengthwise direction whereby it is not possible to compensate for dosing inaccuracies when additives are used. It may be mentioned in this connection that such inaccuracies are always present as it is virtually impossible in practice to feed small quantities of additives such as dyestuffs continually with high dosing accuracy. As it is obvious, the quality of the material to be processed may suffer very substantially by such inaccuracies in the dosing.

Various attempts have been made to design the aforereferred to devices so that they retain the high-grade dispersing capabilities and also have an acceptable mixing capability in lengthwise direction.

It has, for instance, been suggested to interpose adjustable throttling means between the casing of the device and the screws therein to permit an adjustment of the mixing and kneading action independent of the rotational speed of the screws.

It has also been proposed to provide spaced apart and staggered baffle plates on both screw shafts between the conveying elements thereon to obtain a broader dwell time spectrum.

The mixing action in lengthwise direction can, of course, also be improved by using deeply cut screws.

However, all the aforelisted structures entail other and very significant disadvantages. It has been found that the dispersion capability of the device is adversely affected. When shallower threads and positively conveying screws are used throttling means do not produce the desired improvement of the mixing action in lengthwise direction if, for instance, high polymer materials such as rubber, are to be processed. Baffle plates delay the rate of flow through the device and also tend to cause a substantial increase in the temperature of the mixture to be processed.

THE INVENTION

It is a broad object of the invention to provide a novel and improved continuously operating mixing and kneading device of the general kind above referred to which effects a good mixing action in lengthwise direction without adversely affecting the dispersion action of the device and without having the aforeexplained explained disadvantages.

The aforepointed out objects, features and advantages and other objects, features and advantages which will be pointed out hereinafter are obtained by providing downstream of a dispersion zone, which in turn is downstream of an input zone, a mixing zone including coacting screw elements which have less threads than the screw elements in the dispersion zone.

It has been found that the components used in the material fed into the input zone of the device are not thoroughly and homogeneously mixed in this zone but tend to travel through the input zone and also through the subsequent dispersion zone in the form of more or less separate streams. The same applies to additives fed into the device either at the feed end thereof or at intermediate points. Due to the provision of fewer threads for the screw elements in the mixing zone than for the screw elements in the dispersion zone, such streams of components and additives are broken up and a thorough homogeneous mixing of all the components and additives used in the material to be processed is effected. Accordingly, the material leaving the downstream end of a mixing zone constitutes a homogeneous mixture of all components and additives which have been supplied to the device at any point of the length thereof anterior of the downstream end of the dispersion zone. In other words, differences in the concentration of the material of the components and additives contained in and travelling along the individual screw turns are eliminated thus accomplishing the aforepointed out broad object of the invention.

Depending upon the composition of the material to be processed the specific structure of the screw elements in the mixing zone may be varied.

For certain fields of application the screw elements in the mixing zone may have a comparatively open profile. In other fields of application, the diameters of the coacting screw elements in the mixing zone are such that the screw elements do not mesh but coact with each other in tangential relationship.

The pitch of the screw elements in the mixing zone may be different one from the other. The use of a different pitch for the screw elements is particularly advantageous when nonadhering or so-called "rolling" materials are to be processed. It is evident that the differences in pitch of the coacting screw elements in the mixing zone will result in a marked increase in the action in lengthwise direction.

It is also possible to obtain the desired lengthwise mixing action by using smaller cross-sectional areas for the screw elements in the mixing zone than for the screw elements in the dispersion zone. Such reduction in cross-sectional areas is particularly advantageous when the material to be processed is sensitive to temperature.

Any desired number of mixing zones as previously described may be provided in one device. For instance, an input zone and a dispersion zone may be followed by a mixing zone according to the invention which in turn, is followed by a second dispersion zone again followed by a mixing zone according to the invention.

To add components or additives to the device in addition to those initially fed to the device a feed port or other feeding means may be provided at the upstream end of one or more dispersion zones.

In the accompanying drawing a preferred embodiment of the invention is shown by way of illustration and not by way of limitation.

Figure 1:
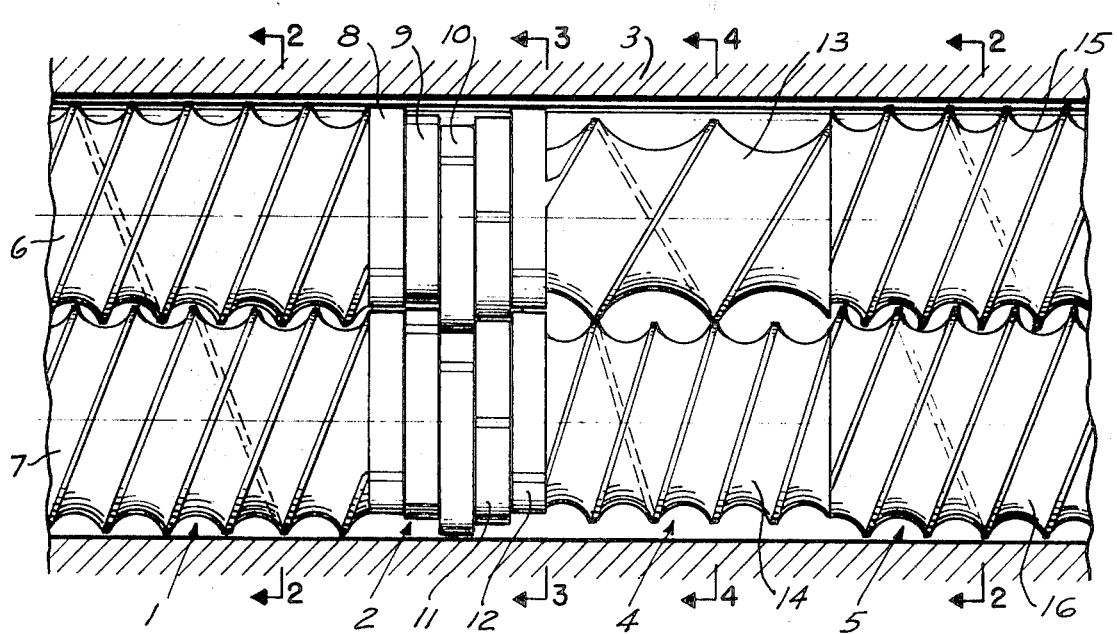
FIG. 1 shows diagrammatically a fragmentary longitudinal section of a mixing and kneading device according to the invention.

In FIG. 1 only those structural components of the device which are essential for the understanding of the invention are shown to simplify the illustration. The device should be visualized as being equipped with suitable and conventional power drive means for rotating the screws of the device, with feed means at the inlet end and discharge means at the outlet end, intermediate ports for feeding additives if desired, and ducts in the casing and in the screw elements to maintain the device at the desired temperature, etc.

Describing now FIG. 1 more in detail, there is shown a drum or casing 3 which includes an input zone 1, a dispersion zone 2, a mixing zone 4 and a discharge zone 5. Accordingly, the material to be processed moves through the drum from left to right. All zones include twin screw elements the specific structure of which will be more fully explained hereinafter.

Figure 3:
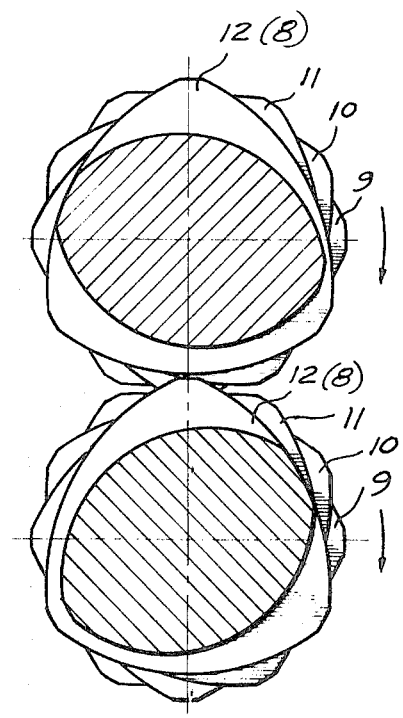
FIG. 3 is a section taken on line 3—3 of FIG. 1.

Input zone 1, that is the zone into which the components of the material to be mixed are fed comprises two screw elements 6 and 7 which are in tight mesh as clearly shown and are multiple thread screw unidirectionally rotated. Both screws are shown as having three threads 6a and 7a respectively of equal pitch. Of course, more than three threads may be provided. The dispersion zone 2 includes two kneading elements each comprising five mutually staggered kneading discs 8, 9, 10, 11 and 12 as shown in FIG. 3. Discs 8 and 12 occupy the same angular relationship so that only four discs of each kneading element are visible in this figure.

As is evident, multiple thread screw elements instead of discs could be used in the dispersion zone as kneading elements.

Figure 4:
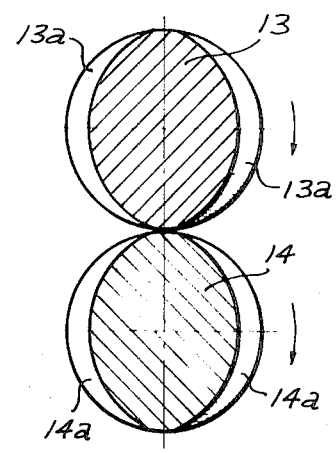
FIG. 4 is a section taken on line 4—4 of FIG. 1.

The mixing zone 4 which as previously explained, serves to break up and mix homogeneously any streams or strings and concentrations of components or additives which may still exist when the material enters the mixing zone comprises screw elements 13 and 14. As is clearly shown, the screw elements 13 and 14 are multiple thread screw having less threads than the kneading elements in the dispersion zone, to wit, two threads 13a and 14a respectively as shown in FIG. 4. As it is evident, the kneading elements in the dispersion zone 2 will deliver three flows of material to the mixing zone 4. These three flows will be automatically combined to two flows in the mixing zone due to the provision of only two threads in this zone, thereby effecting a forceful and intimate mixing of the material in this zone. In other words, the concept of the invention sides in reducing in the mixing zone the number of flows of material delivered to this zone from the dispersion zone. The pitch of screw element 13 may be different from that of screw element 14. To permit coaction of screw elements with a different pitch and also with a different number of threads the diameters of screw elements 13 and 14 are reduced so that the screw elements are not in mesh but coact in tangential relationship. As previously explained, the structure of the screws in zone 4 causes the desired homogeneous mixture of all the components and additives, if any, when and while the material passes through the zone. Accordingly, the material after it has travelled through the device from the inlet end thereof to the downstream end of zone 4 is in homogeneous condition.

Figure 2:
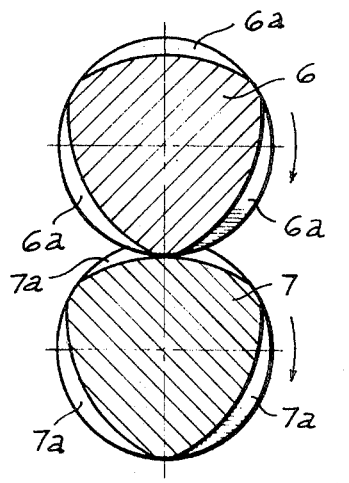
FIG. 2 is a section taken on either lines 2—2 of FIG. 1.

Finally, the discharge zone 5 has screw elements 15 and 16 similar to screw elements 6 and 7, that is, the screw elements are in tight mesh with each other and have each three threads. Accordingly, FIG. 2 applies to zone 5 also.

While the screw elements are shown in the several figures as one-piece elements, it is also possible and within the scope of the invention to provide core shafts on which sleeves with multiple threads or gangs are fixedly seated.

What is claimed, is:

1. A continually operating device for homogeneously mixing components of a plasticizable material, said device comprising in combination:

a casing having a discharge end;

an input zone in said casing including two unidirectionally rotatable meshing parallel screw elements each having several threads for mixing components of the material fed into said input zone and conveying the mixed components toward the discharge end of the casing;

a dispersion zone disposed in the casing downstream of said input zone, said dispersion zone including two parallel meshing rotatable dispersion elements each having several threads for dispersing components received therein from the input zone and conveying the resulting mixture toward the discharge end of the casing; and a mixing zone disposed in the casing downstream of and adjacent to said dispersion zone, said mixing zone including two coacting parallel screw elements, said screw elements in the mixing zone having fewer threads than the dispersion elements in the dispersion zone whereby flows of material delivered from the dispersion zone to the mixing zone are combined so as to reduce the number of delivered flows in the latter zone thus effecting intensive mixing of the material in the mixing zone.

2. The device according to claim 1 wherein the screw elements in the mixing zone have fewer threads than the screw elements in the input zone.

3. The device according to claim 1 wherein the two screw elements in the input zone and the two dispersion elements in the dispersion zone respectively are in tight mutual engagement one with the other.

4. The device according to claim 1 wherein the two dispersion elements in the mixing zone have diameters such that the elements are out of mesh but coact in tangential relationship with each other.

5. The device according to claim 1 wherein the two screw elements in the mixing zone coact in tangential relationship with each other, and wherein the turns of said screw elements have a pitch different one from the other.

6. The device according to claim 4 wherein the cross-sectional areas of the two screw elements in the mixing zone are smaller than the corresponding cross-sectional areas of the elements in the input zone and the dispersion zone.

7. The device according to claim 1 and further comprising a discharge zone downstream of the discharge end of the mixing zone in communication therewith, said discharge zone including two unidirectionally rotatable parallel meshing screw elements having more threads than the screw elements in the mixing zone.